Feb. 6, 1968  H. ORNER  3,367,201
BALL BEARING SCREW AND NUT MECHANISM
Filed July 12, 1965  2 Sheets-Sheet 1
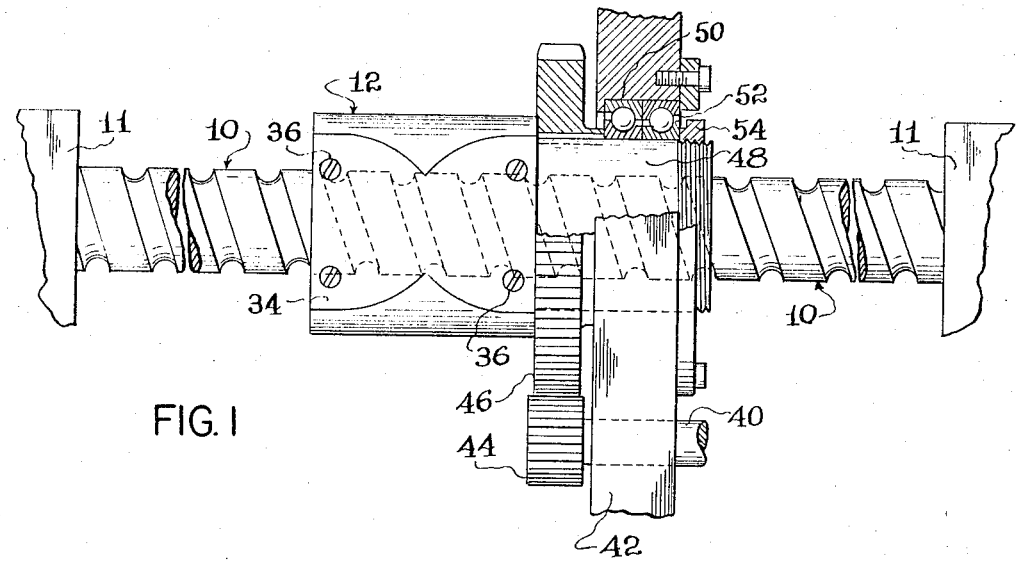
FIG. 1
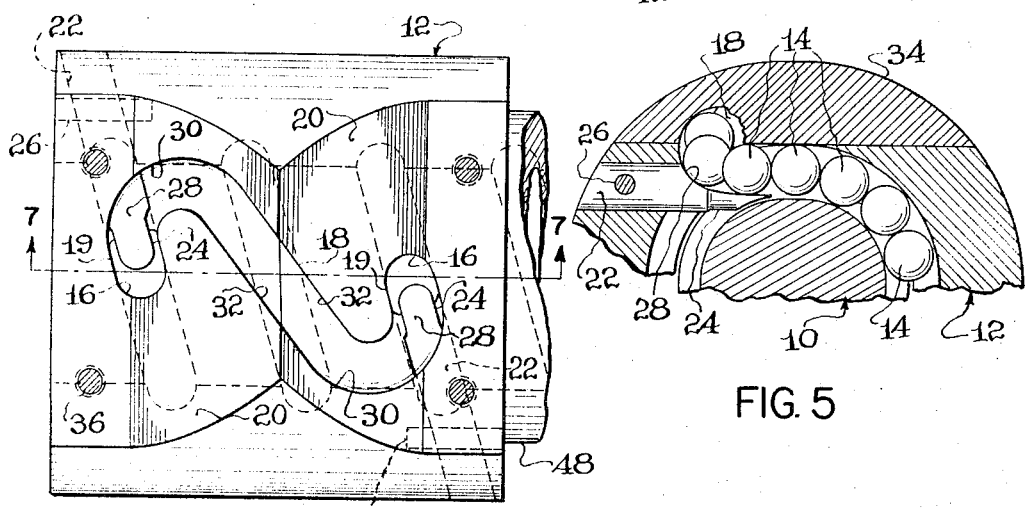
FIG. 6
FIG. 5
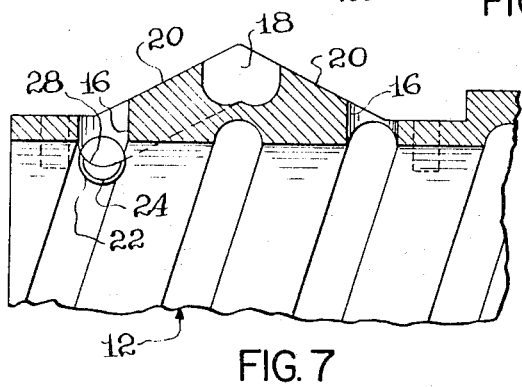
FIG. 7
INVENTOR.
Harry Orner Feb. 6, 1968            H. ORNER            3,367,201

BALL BEARING SCREW AND NUT MECHANISM

Filed July 12, 1965            2 Sheets-Sheet 2

INVENTOR.
Harry Orner

# United States Patent Office 3,367,201
Patented Feb. 6, 1968

3,367,201
BALL BEARING SCREW AND NUT MECHANISM
Harry Orner, 2479 Glen Canyon Road,
Altadena, Calif. 91001
Filed July 12, 1965, Ser. No. 471,362
9 Claims. (Cl. 74—424.8)

ABSTRACT OF THE DISCLOSURE

A ball bearing screw and nut mechanism having a recirculating passage in the nut for the balls to recirculate from one end of the ball race load groove to the other end. The recirculating passage is formed as a reverse curve on two inclined planes along the length of the nut. Pick-up structures at the junction of the recirculating passage and the load groove having inner extended ends tangent to the load groove to form the extreme ends of the reverse curve recirculating passage in a single curvilinear continuity curve. A cover over the recirculating passage on the inclined planes to retain the balls therein.

---

Ball bearing screw and nut mechanisms are widely used for a number of applications in which it is desired to transform rotary motion to linear motion, or vice versa. Such mechanisms conventionally comprise a helical ball race formed of a number of turns between the screw and nut, and a relatively long external tube recirculating the balls from one end of the ball race to the other. The conventional construction, however, is disadvantageous in that an external ball-return tube is subject to breaking and bending. Also the tube provides a pick-up structure for the balls at each end of the ball-return tube which is dimensionally limited to the wall thickness of the tube resulting in limited load carrying capacities. Also the load races in this type of structure result in half convolutions with unequal load distribution of the balls on the helical ball race.

The recirculating structure of all present ball bearing nuts and screws has assembled component parts that lack efficient continuity to provide smooth transition of the balls from the ball race grooves to the recirculating system and vice versa.

The present invention provides a ball bearing nut and screw structure obviating the foregoing major disadvantages and others as will be apparent by the following disclosure. In lieu of the external return tube for recirculating the balls of former designs, this invention employs a recirculating path within the nut structure having true curvilinear continuity.

It is the primary object of this invention to provide an improved ball bearing screw and nut structure of relatively high value of load capacities at high efficiency of energy transmission.

Another object of this invention is to provide a ball-return race construction to guide the balls over the screw thread crest in the form of a reversed curve so constructed that the ball race takes the general form of a letter S fabricated in the nut material, and there is true curvilinear continuity at all points in the ball race so that friction and other losses are reduced to the very minimum.

Another object of this invention is to provide a ball bearing nut construction, to rotate freely on a stationary screw, being symmetrical in configuration and adaptable for dynamical balancing.

Another object of this invention is to provide a ball bearing nut structure with a return-race that can be fabricated by a milling operation with solid pick-up pins in place, to cut the race and pick-up pins in one operation to form true curvilinear continuity at all points in the ball race.

Another object of this invention is to provide a ball bearing nut structure with a load race having one or more full 360 degree convolutions.

Another object of this invention is to provide solid pick-up pins at each junction of the recirculating groove and load groove of the ball bearing nut and screw to provide maximum strength.

Another object of this invention is to provide a ball bearing nut structure which provides access to the full length of the return groove for maintenance and loading the balls.

A further object of this invention is to provide a highly simple and economical nut means incorporating devices for causing the ball recirculating groove to take the form of a reversed curve along two inclined planes along the length of the nut.

These and other objects and advantages of this invention will be more fully set forth in the following specification and claims considered in connection with the attached drawings to which they relate.

In the drawings:

FIGURE 1 is a view partly in longitudinal section of one preferred embodiment of a ball bearing nut and screw mechanism incorporating the present invention;

FIGURE 5 is a fragmentary sectional view taken on the broken line 5—5 of FIGURE 2;

FIGURE 6 is a view similar to FIGURE 2, with the ball bearing screw and balls removed; and, FIGURE 7 is a fragmentary sectional view taken on the broken line 7—7 of FIGURE 6.

Figure 2:
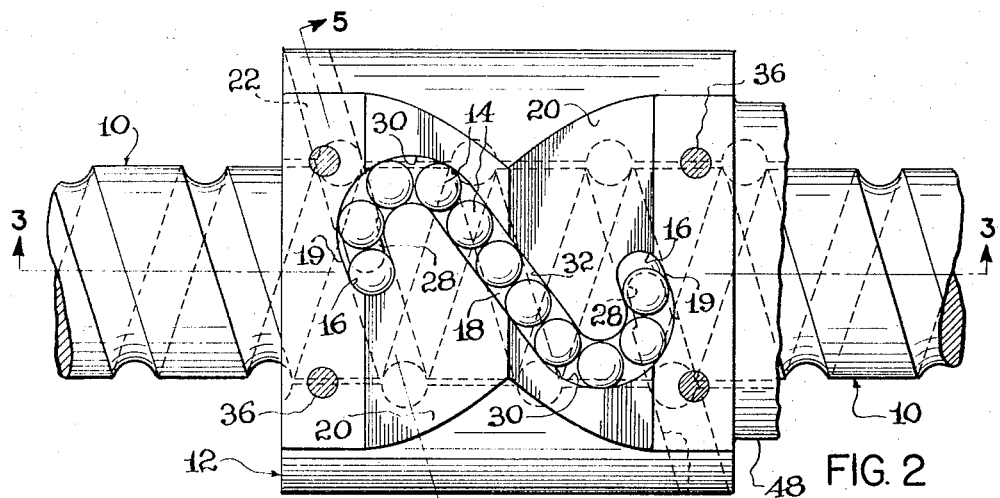
FIGURE 2 is an enlarged view of a portion of FIGURE 1 showing the ball bearing nut with a portion removed to illustrate the internal configuration.
Figure 3:
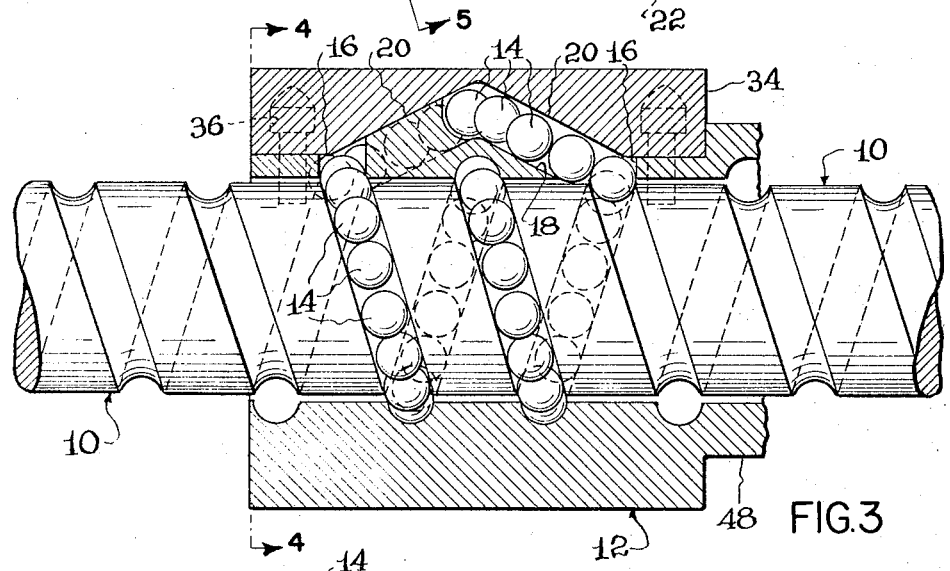
FIGURE 3 is a sectional view taken on the broken lines 3—3 of FIGURE 2.
Figure 4:
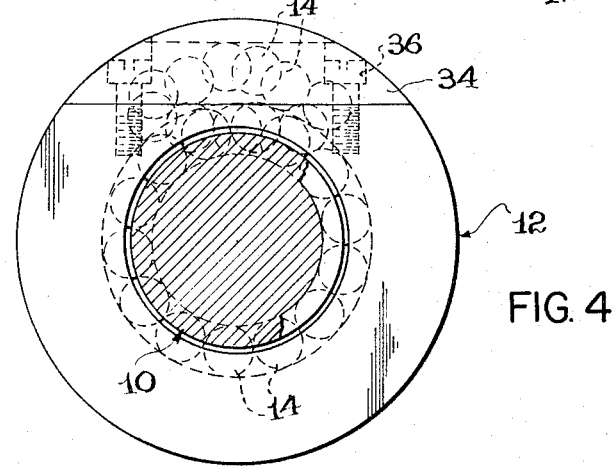
FIGURE 4 is a sectional view taken on the broken line 4—4 of FIGURE 3.

Referring to FIGURE 1, there is shown one preferred embodiment of this invention comprising a helically grooved screw 10 stationarily supported in members 11, at each end of the screw 10. Screw 10 further rotatably supports thereon a ball bearing nut 12. Nut 12 is shaped with an internal helical groove corresponding to the external groove in screw 10 and mating therewith to form a major loop race for a plurality of balls 14. The balls 14 are mounted in multiples of single complete turns or loops of the screw and nut grooves. In this illustrated embodiment (see FIGURES 2 and 3), two complete turns are shown; however, one or more turns may be incorporated as may be desired. The end portion 16 of these turns being, however, overlapped slightly as shown, and are located at the ends of the return or recirculating groove 18 in the ball bearing nut structure.

The return groove 18 is formed, as shown most particularly in FIGURES 6 and 7, by drilling two holes timed with the internal grooves of the nut at the said overlapping portions 16. From these holes are milled the return groove to form in general an S shape connecting these holes and at a depth and size to permit free passage of balls from hole 16 to hole 16. This milling operation can be done by a pantograph machine which is well known to the art. This return groove 18 moves along an inclined surface 20, as best shown in FIGURE 7, to midway of the distance between the end portions 16, and back down along a similar incline 20.

At the end portions 16, at the junction of the internal grooves and the return groove 18 are pickup pins 22, formed cylindrical and fitted in bored holes in the nut structure 12, and located on an angle similar to the lead angle of the helical grooves of the ball bearing nut and screw. The inner ends 24 of the pickup pins 22, at the portion 16 is located slightly below the load grooves; reference is made to FIGURES 5 and 7. The inner ends 24 are reduced in diameter to clear the load grooves at that point and extend inwardly to the junctions of the load grooves and return groove 18. Pickup pins 22 are retained in place by drive pins 26. The operation of milling the return groove 18 will also include the curved surface 28 of the inner end 24 of the pickup pin 22 in one continuous smooth curved surface between the end portions 16, so as to provide an uninterrupted free flow of the balls 14.

Return groove 18 starts at end portion 16 and follows for a short distance 19, at least for the length of a ball 14 on each pickup pin 22 and at the same angle as the lead angle of the helical load grooves, to permit the balls to leave the load groove without interference at this critical point. This also permits the ball behind the ball on the surface 28 of pin 22 to transfer its force in a straight line thereon. The return groove then makes a smooth radial turn 30, into a straight connection portion 32. In certain applications where geometric conditions may require, straight portion 32 may be omitted and the radial turns 30, blended into each other to serve the same purpose.

A cap 34 is fitted on the surface 20, of the nut to captivate the balls 14 within the return groove 18, and permit free flow therethrough; see FIGURES 1, 3, 4, and 5. Cap screws 36 maintain cap 34 in assembly with nut 14.

This now results in a ball bearing nut structure and recirculating system to withstand great stresses of load at highly efficient power transmission due to the free flow of balls 14 onto the pickup pin 22 to recirculating groove 18 and back onto the pickup pin 22 on the other end, and back into the helical load grooves of the ball bearing nut and screw, this being primarily due to the milling in the same operation of both the pickup pins 22 and the return groove 18, and the construction thereof.

In an illustrated example of operation, the ball bearing nut 12 can be used to transverse, see FIGURE 1, by a rotary source of power on drive shaft 40, a load associated with plate member 42 along stationary screw 10. Pinion gear 44 rotatably fixed on drive shaft 40 meshes with gear 46. Gear 46 is mounted to rotate with a reduced diameter 48 of nut 12. The reduced diameter 48 further extends in a hole 50 in the plate member 42 and is rotatably supported therein by ball bearings 52, and retained therein by nut 54 on the threaded end thereof.

Thus any rotary motion of drive shaft 40 drives ball bearing nut 12 by the meshing of pinion 44 with gear 46 to rotate on stationary ball bearing screw 10. Plate member 42 may be any structure of a machine moved in a horizontal direction as shown, or of an elevator if moved in a vertical direction, by the rotatable action of the balls 14 in the helical load grooves of the ball bearing nut and screw cooperative action. The balls 14 are recirculated as they roll out of the helical load groove by the improved recirculating structure of this invention with no obstruction or sharp corner turns and back into the helical load grooves, in either rotational direction of drive shaft 40, to move nut 12 in either relative direction on screw 10 with the same freedom of minimum power.

While this particular apparatus herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A ball bearing screw and nut mechanism, comprising a screw having an external helical groove, a nut having an internal helical groove, said grooves mating with each other to form a working ball race loop, a recirculating passage of reversed curves over a longitudinal area inclined to the axis of the nut with ends arranged to merge with the ends of said working ball race loop to form a continuous endless ball race, said recirculating passage being formed within said nut and free of abrupt changes in the direction of ball travel therethrough, and a plurality of balls mounted in said continuous ball race to lock said nut and screw in assembled relation.

2. The invention as claimed in claim 1, wherein said recirculating passage is formed on inclined planes from merging areas of the ends of said working ball race loop and said recirculating passage and which meet half way therebetween to move said balls out of one of said merging areas into the body of said nut and back to the other said merging area of the nut.

3. The invention as claimed in claim 2, wherein said recirculating passage in said nut is closed by a cover to captivate said balls to move freely limited to the direction of said recirculating passage.

4. A ball bearing screw and nut mechanism, comprising a screw having an external helical groove, a nut having an internal helical groove, said grooves mating with each other to form a working ball race loop, a recirculating passage having ends arranged to merge with the ends of said working ball race loop to form a continuous endless ball race, a plurality of balls mounted in said continuous ball race to lock said nut and screw in assembled relation, said recirculating passage having said ends at a depth in said nut to said external helical groove of said screw, said recirculating passage being developed between said ends in the body of said nut; starting with a short straight portion thereof following the lead of the helical grooves and tangent thereto, then followed by a curved area tangent to said straight portion and at the same time inclined upward relative to the axis of said screw to meet midway between said ends of said recirculating passage, said two curved areas being interconnected to form a smooth curved passage.

5. The invention as claimed in claim 4, wherein said recirculating passage has pickup pins anchored in said nut with inner extending ends forming a portion of said recirculating passage at said short straight portion.

6. A ball bearing screw and nut mechanism, comprising a screw having an external helical groove, a nut having an internal helical groove, said grooves mating with each other to form a working ball race loop, a recirculating passage having ends arranged to merge with the ends of said working ball race loop to form a continuous endless ball race, a plurality of balls mounted in said continuous ball race to lock said nut and screw in assembled relation, said recirculating passage having said ends on a line parallel to the axis of said screw and at a depth in said nut to said external helical groove of said screw, said ends having mounted pickup pins with inner ends extending into the groove of said screw, said recirculating passage being formed as a uniform groove between said ends, said uniform groove being formed starting at one of said ends including said inner end of the respective said pickup to form straight portion following the lead angle of the helical groove, a curved portion of the said uniform groove tangent to said straight portion and tangent at the opposite end to a similar second straight portion following the lead angle of the helical groove including said respective inner end of said other pickup to form a continuous smooth race for the passage of said balls.

7. A ball bearing screw and nut mechanism, comprising a nut and mating screw, a working helical ball race loop therein, a plurality of balls in said working ball race loop to transmit by rolling action rotary motion into linear motion, a recirculating passage connecting two ends of said working ball race loop in said nut to recirculate said balls from one end of said working ball race to the other said end, said recirculating passage being formed as a groove in planes passing through the circumference of said nut, said recirculating passage formed in said planes in a smooth reversed curve longitudinally of said nut.

8. The invention as claimed in claim 7, wherein pickup pins are secured in said nut with inner ends extending into said helical ball race loop and surfaces thereon forming part of said recirculating passage.

9. A ball bearing screw and nut mechanism, comprising a screw having an external helical groove, a nut having an internal helical groove, said grooves mating with each other to form a working ball race loop, a recirculating passage of reversed curves over a longitudinal area along the nut with ends arranged to merge with the ends of said working ball race loop to form a continuous endless ball race, said recirculating passage being formed within said nut and free of abrupt changes in the direction of ball travel therethrough, and a plurality of balls mounted in said continuous race to lock said nut and screw in assembled relation, wherein said recirculating passage has said ends terminating on a line parallel to the axis of said screw to establish one or more full convolutions in said working race to maintain equal loading of the balls in the working ball race loop.

References Cited
UNITED STATES PATENTS

| | | | |
|---|---|---|---|
| 2,322,000 | 6/1943 | Douglas | 74—459 X |
| 2,851,897 | 9/1958 | Cochrane | 74—459 |
| 2,959,978 | 11/1960 | Boutwell | 74—459 |

DONLEY J. STOCKING, *Primary Examiner.*

L. H. GERIN, *Assistant Examiner.*